(12) United States Patent
Suzuki (10) Patent No.: US 8,233,030 B2
(45) Date of Patent: Jul. 31, 2012

(54) PICTURE SIGNAL PROCESSING DEVICE

(75) Inventor: Yasuo Suzuki, Utsonomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 1493 days.

(21) Appl. No.: 11/424,469

(22) Filed: Jun. 15, 2006

(65) Prior Publication Data

US 2006/0284881 A1 Dec. 21, 2006

(30) Foreign Application Priority Data

Jun. 17, 2005 (JP) ................. 2005-177963

(51) Int. Cl.
*H04N 15/00* (2006.01)
(52) U.S. Cl. ........................................................ 348/41
(58) Field of Classification Search ..................... 348/41
See application file for complete search history.

(56) References Cited

U.S. PATENT DOCUMENTS

| 4,562,471 | A | | 12/1985 | Eouzan et al. |
| 5,057,920 | A | | 10/1991 | Wilkinson |
| 5,596,427 | A | * | 1/1997 | Honma et al. ................ 358/515 |
| 5,748,335 | A | * | 5/1998 | Honma et al. ................ 358/445 |
| 2004/0217982 | A1 | | 11/2004 | Wang |

FOREIGN PATENT DOCUMENTS

| EP | 0969443 A1 | 1/2000 |
| JP | 5-292538 A | 11/1993 |
| JP | 9-181939 A | 7/1997 |

* cited by examiner

*Primary Examiner* — David Czekaj
(74) *Attorney, Agent, or Firm* — Canon USA, Inc., IP Division (57) ABSTRACT

A picture signal processing device is provided capable of correcting black level in a display device with minimal memory capacity, by switching the capture region of input picture signals from valid display region to a blanking region at the timing of automatic signal format detection, such as input signal switchover.

4 Claims, 8 Drawing Sheets

PICTURE SIGNAL PROCESSING DEVICE

BACKGROUND OF THE INVENTION

1. Field of the Invention

The present invention relates to a technique for preventing black level fluctuation due to clamp error in input picture signals, in a display device such as a liquid crystal projector or a computer display.

2. Description of the Related Art

Many display devices such as computer displays and liquid crystal projectors and the like have interface terminals for inputting analog picture signals (analog RGB signals and analog YCrCb signals). The input analog picture signals are converted into digital values at an internal AD conversion circuit, and subjected to signal processing.

Figure 8A:
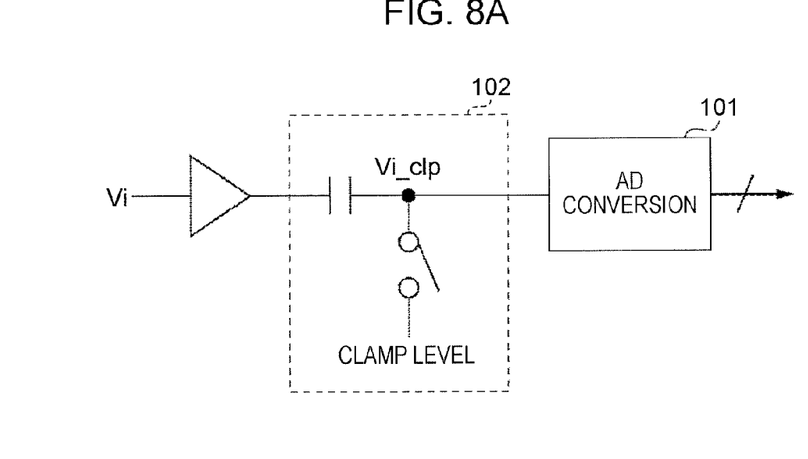
FIG. 8A is a diagram illustrating a general clamp circuit.
Figure 8B:
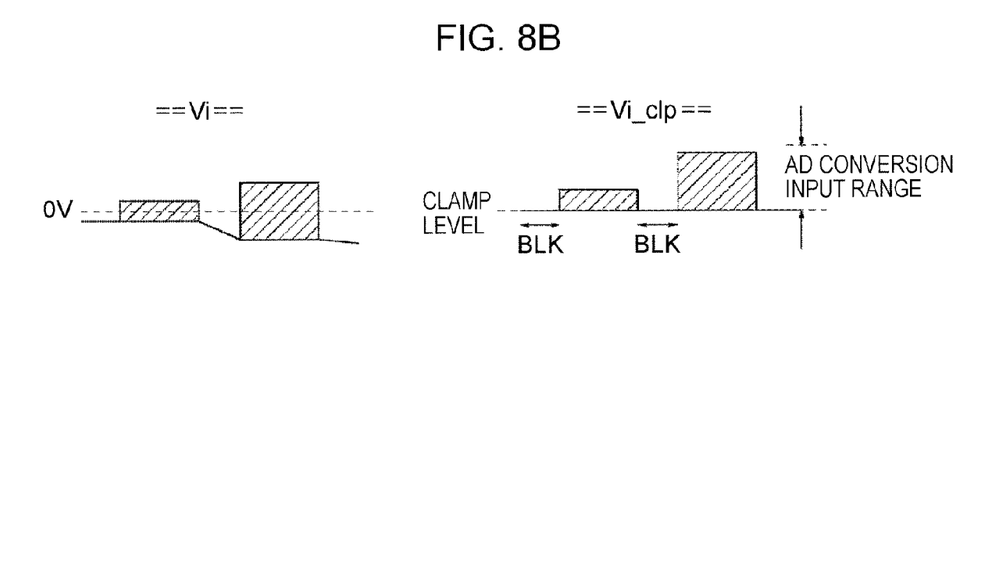
FIG. 8B is a diagram illustrating picture signals before and after clamping.

FIGS. 8A and 8B illustrate signal processing performed up to the AD conversion circuit in a general display device. While such a display device would normally be configured from three equivalent circuits for each of R, G, and B, only one circuit is shown here.

As shown in FIG. 8A, the input picture signal Vi is subjected to DC component reproduction processing at a clamp circuit 102, which is upstream from an AD conversion processing circuit 101.

The left side of FIG. 8B shows the waveform before clamping of the input picture signal, and the right side thereof shows the waveform following clamping. The clamp circuit 102 takes the blanking period (BLK) of the input picture signal to forcibly change the signal level of the input picture signal to a clamp level (a level equivalent to level 0 following AC conversion, for example). Accordingly, as long as the blanking region of the input picture signal (equivalent to black signal) can always be clamped before AD conversion, the black signal is always digitized to black level (e.g., level 0).

However, in actual display devices, there is a phenomenon wherein the black level is not always reproduced as black, due to the following reasons, resulting in so-called black level fluctuation.

(1) Difference in DC component of input picture signals from the output device
(2) Clamp error at clamp circuit
(3) Offset error from sampling clock frequency in AD conversion Feedback clamping has been proposed as a technique for solving the problem of black level fluctuation. Feedback clamping methods include a technique for comparing the black level in the analog signal format (See Japanese Patent Laid-Open No. 5-292538) and a technique for feedback to the clamp filter using data digitized by AD conversion (Japanese Patent Laid-Open No. 181939).

However, the former related art disclosed in Japanese Patent Laid-Open No. 5-292538 requires complicated analog signal processing circuits before AD conversion. This is in itself problematic, since a high-resolution display device requires 150 MHz or higher bandwidth for input analog picture signals. Accordingly, signal splitters and switching circuits and the like in the picture signal lines results in impedance matching problems, which in turn deteriorates the bandwidth of the picture signals, so the circuit before signal conversion should be as simple as possible.

On the other hand, the later related art Japanese Patent Laid-Open No. 9-181939 requires latch circuits or frame memory for always holding the digital level of the blanking portion, in addition to holding picture signals.

This method increases the frame memory installed, which is undesirable from a cost perspective as well. For example, in order to hold high-resolution picture signals of SXGA (1280× 1024), the capacity of the frame memory required is 1280 (horizontal)×1024 (vertical)×8 (bit)×3 (colors), which is approximately 4 megabytes.

Also, further memory increases will be necessary to handle even higher resolution picture signals. Either that, or the signals must be compressed to below a certain capacity level, which could lead to deterioration of image quality. Further, complicated compression processing is required, which is undesirable from a circuit perspective. Accordingly, for all practical purposes, ensuring memory capacity for always storing the blanking region in addition to the picture signals is not realistic.

SUMMARY OF THE INVENTION

Accordingly, the present invention provides a display device which can perform black level correction (clamp correction) in a sure manner without requiring complex circuits or great amounts of memory.

To this end, the image display device according to the present invention detects change in the input signal format, and based upon the detection results, switches between a first write mode in which the intake range thereof is a valid display region of the input signals, and a second write mode in which the intake range thereof is a blanking region of the input signals.

Further features of the present invention will become apparent from the following description of exemplary embodiments (with reference to the attached drawings).

DESCRIPTION OF THE EMBODIMENTS

Embodiments of the present invention will be described below with reference to the attached drawings.

First Embodiment

Figure 1:
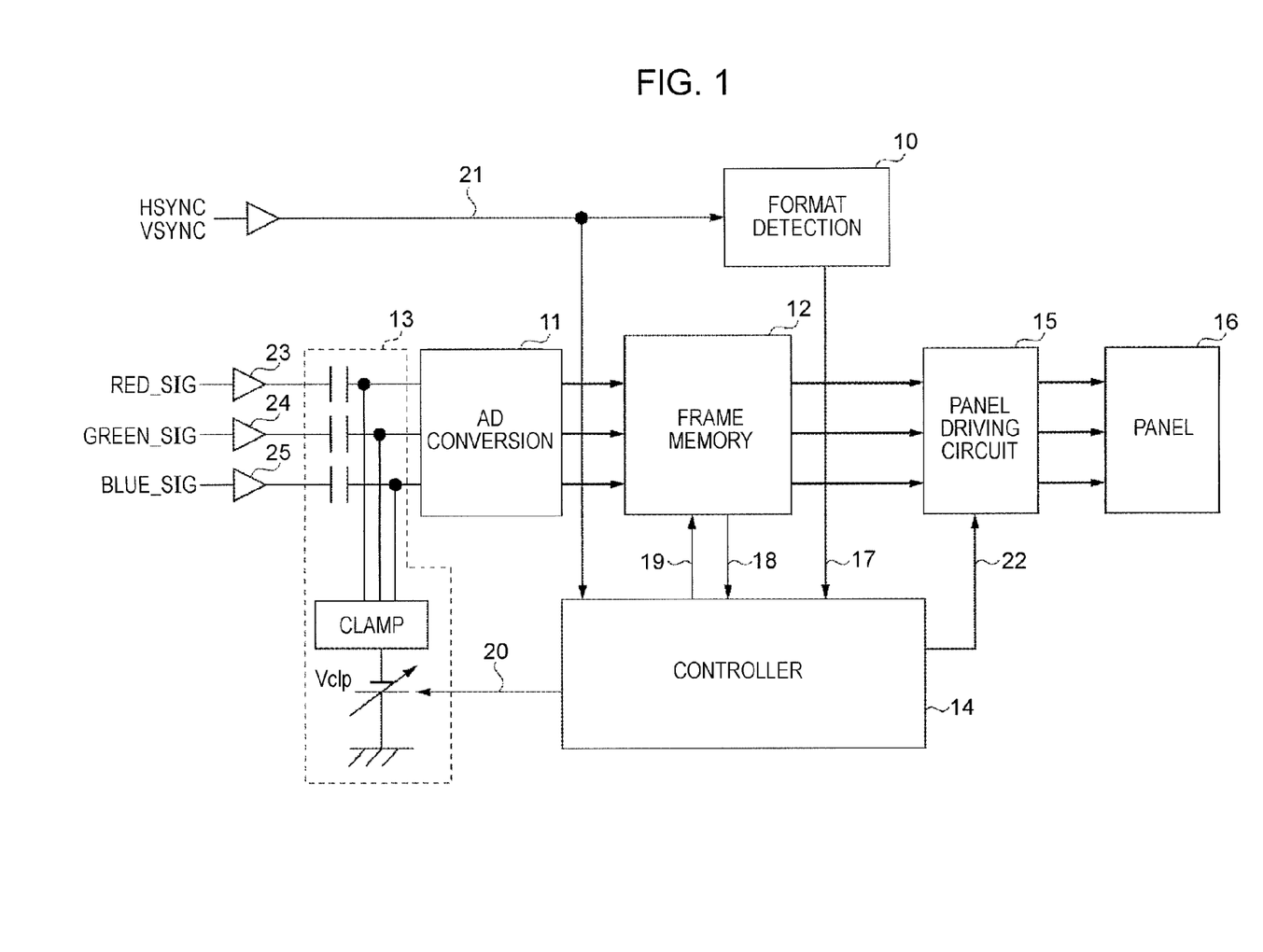
FIG. 1 is a diagram illustrating a first embodiment of the present invention.

FIG. 1 is a diagram illustrating a first embodiment of the present invention.

Input picture signals RED_SIG 23, GREEN_SIG 24, and BLUE_SIG 25, are clamped to the voltage Vclp by a clamp circuit 13 and fixed to black level, and then digitized at the AD converter 11. The digitiazed data is written to frame memory 12 at one of the two following timings.

(a) Blanking Write Mode

Figure 2:
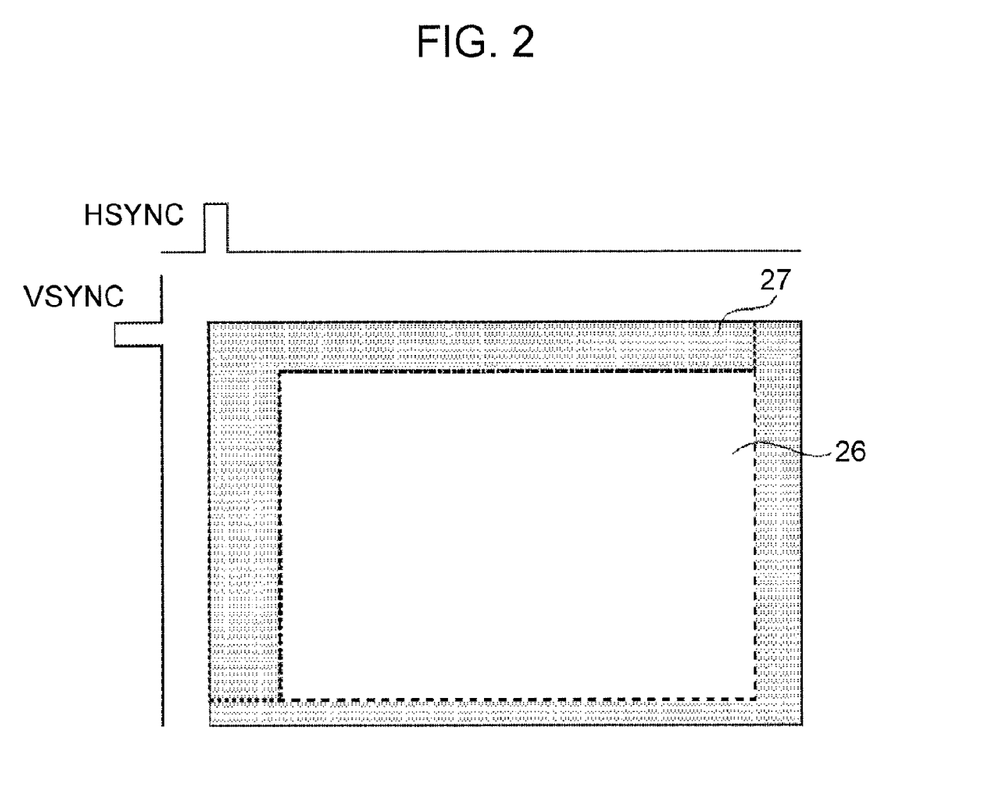
FIG. 2 is a diagram illustrating an example of regions for two write modes.

FIG. 2 is a diagram illustrating one frame of picture signals with the timing of synchronizing signals HSYNC and VSYNC. The blanking write mode is a mode for writing only to regions other than the valid image region 26 (e.g., horizontal and vertical invalid region 27) to the frame memory 12.

(b) Valid Image Write Mode

The valid image write mode is for writing only the valid image region 26 to the frame memory 12.

In the blanking write mode, black level corresponding processing is performed according to the later-described sequence.

On the other hand, with the valid region write mode, the valid region image data written to the frame memory 12 is subjected to signal processing such as gamma processing, phase extension, AC conversion, level shift, and so forth, and is displayed on the panel 16.

The picture format detecting circuit 10 detects the resolution and frame rate of the input picture signals (23, 24, 25) using synchronizing signals HSYNC and VSYNC 21 synchronized to the input picture signals (23, 24, 25).

For example, in the event that the cycle of HSYNC is 15.6 μs and the cycle of VSYNC is 16.7 μs, the picture format detecting circuit 10 determines from a mode table that the input signals are 1280×1024, with a frame rate of 60.02 Hz (VESA SXGA 60 Hz).

The horizontal/vertical SYNC width, horizontal/vertical invalid region, horizontal/vertical valid region, and the horizontal/vertical total pixels data, are calculated. This information is exchanged with a controller 14 as picture format information 17.

Figure 3:
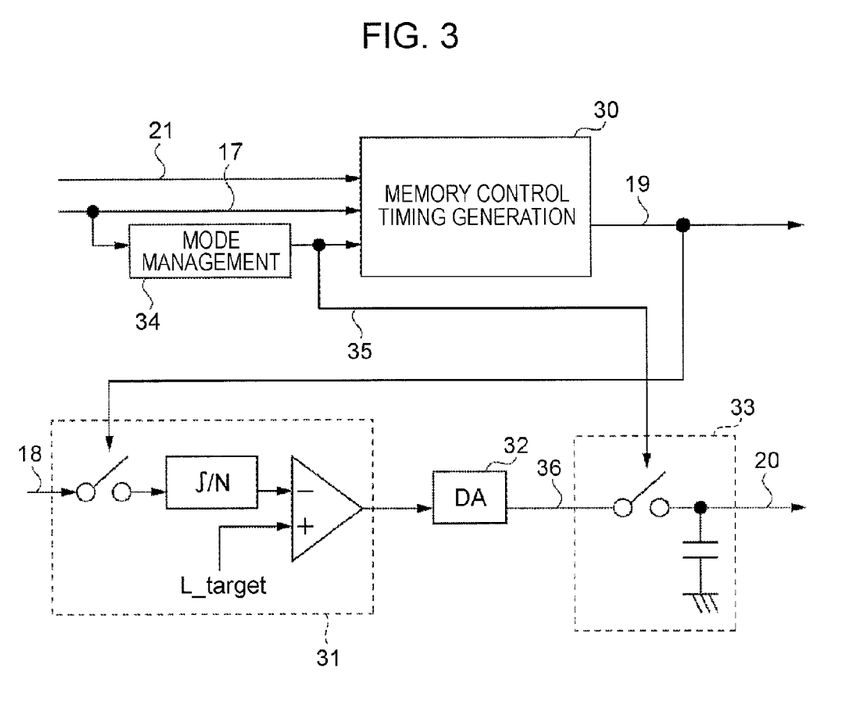
FIG. 3 is a diagram illustrating the internal configuration of a controller according to the first embodiment.

FIG. 3 is a diagram illustrating the details of the interior of the controller 14. A mode managing unit 34 detects whether or not the format of the input signals has changed, using the picture format information 17. Upon detecting change, the mode makes transition to the blanking write mode. After black level correction is ended, the mode makes transition to the valid image write mode. Thus, the mode managing unit 34 manages mode transition of the frame memory access modes.

A memory control signal generating unit 30 generates memory control signals 19 corresponding to the frame memory 12, using the synchronizing signals HSYNC and VSYNC, picture format information 17, and mode information 35.

The memory control signals 19 are timing signals indicating start, end, enable, and disable, of write/read. The memory control signals 19 are generated at the timing of writing the blanking region 27, in the case that the mode information is in the blanking write mode, while the case that the mode information is in the valid image write mode, the memory control signals 19 are generated at the timing of writing the valid image region 26.

An integration circuit 31 obtains the difference between the integration of the data 18 (L_blk) read out form the frame memory 12, the average value thereof, and a predetermined target black level (L_target), and generates a correction level (L_correction), as shown in Expression 1.

$$L\_correction = L\_target - (1/N) * \int^N L\_blk(i) di \qquad \text{Expression 1}$$

A DA converter 32 is a circuit for converting the digital data averaged at the integration circuit 31 into analog signals suitable for clamp potential control (clamp potential control signals 36). A hold circuit 33 is a circuit for holding the clamp potential control signals 36 in the blanking write mode, during the valid image write mode.

Figure 4:
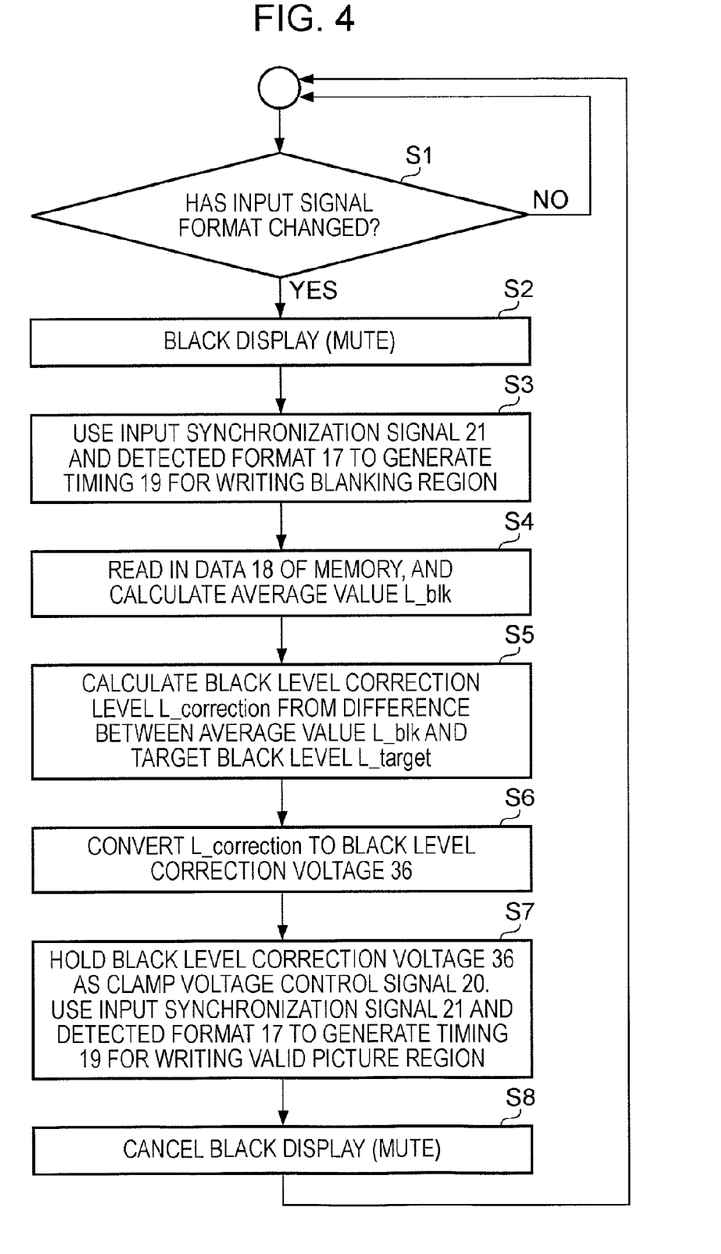
FIG. 4 is a flowchart illustrating the processing flow of the first embodiment.

Next, a specific sequence for black level correction processing will be described. FIG. 4 is a flowchart illustrating the flow of processing performed by the controller 14.

Step S0: The picture format information 17 is input, and determination is made regarding whether or not the format of the input signals has changed. In the event that the format has changed, the picture format information 17 is obtained from the picture format detecting circuit 10, and the mode managing unit 34 makes transition to the blanking write mode. Only in the event of transition to the blanking write mode does the flow proceed to step S1.

Step S1: The picture format information 17 is received from the picture format detecting circuit 10.

Step S2: A panel driving circuit 15 is subjected to black display or mute control 22, so that the image in the frame memory 12 is not displayed on the panel.

Step S3: At the memory control signal generating unit 30, timing signals 19 are generated so as to write the blanking region 27 of the input picture signals to the frame memory 12, using the synchronizing signals 21 and the picture format information 17.

Step S4: Data 18 of the frame memory 12 is read in and integration and averaging is performed. The averaged value is taken as L_blk.

Step S5: The black level correction level L_correction is calculated from the difference between the average value L_blk and the target back level L_target.

$$L\_correction = L\_target - L\_blk \qquad \text{Expression 2}$$

For example, in the event that the black level needs to be always kept at level 0, L_target=0, so $$L\_correction = -L\_blk \qquad \text{Expression 3}$$

Step S6: The black level correction level L_correction is converted into the black level correction voltage 36 of the analog potential, by the DA converter 32.

Step S7: The mode managing unit 34 makes transition to the valid image write mode, the hold circuit 33 holds the black level correction voltage 36, obtaining clamp potential control signals 20. At the same time, at the memory control signal generating unit 30, timing signals 19 are generated so as to write the valid image region 27 of the input picture signals to the frame memory 12, using the synchronizing signals 21 and the picture format information 17.

Step S8: The panel driving circuit 15 is subjected to cancellation of black display or cancellation of mute control 22, so that the image in the frame memory 12 is displayed on the panel.

Subsequently, the flow returns to step S1.

With the present embodiment, description has been made regarding the arrangement wherein transition is made to the blanking write mode by determining whether or not the picture format of the input signals has changed. However, with devices having multiple input interface terminals for example, mode transition may be made upon the user pressing an input switchover button, or pressing a signal format auto-detect button.

Second Embodiment

Figure 5:
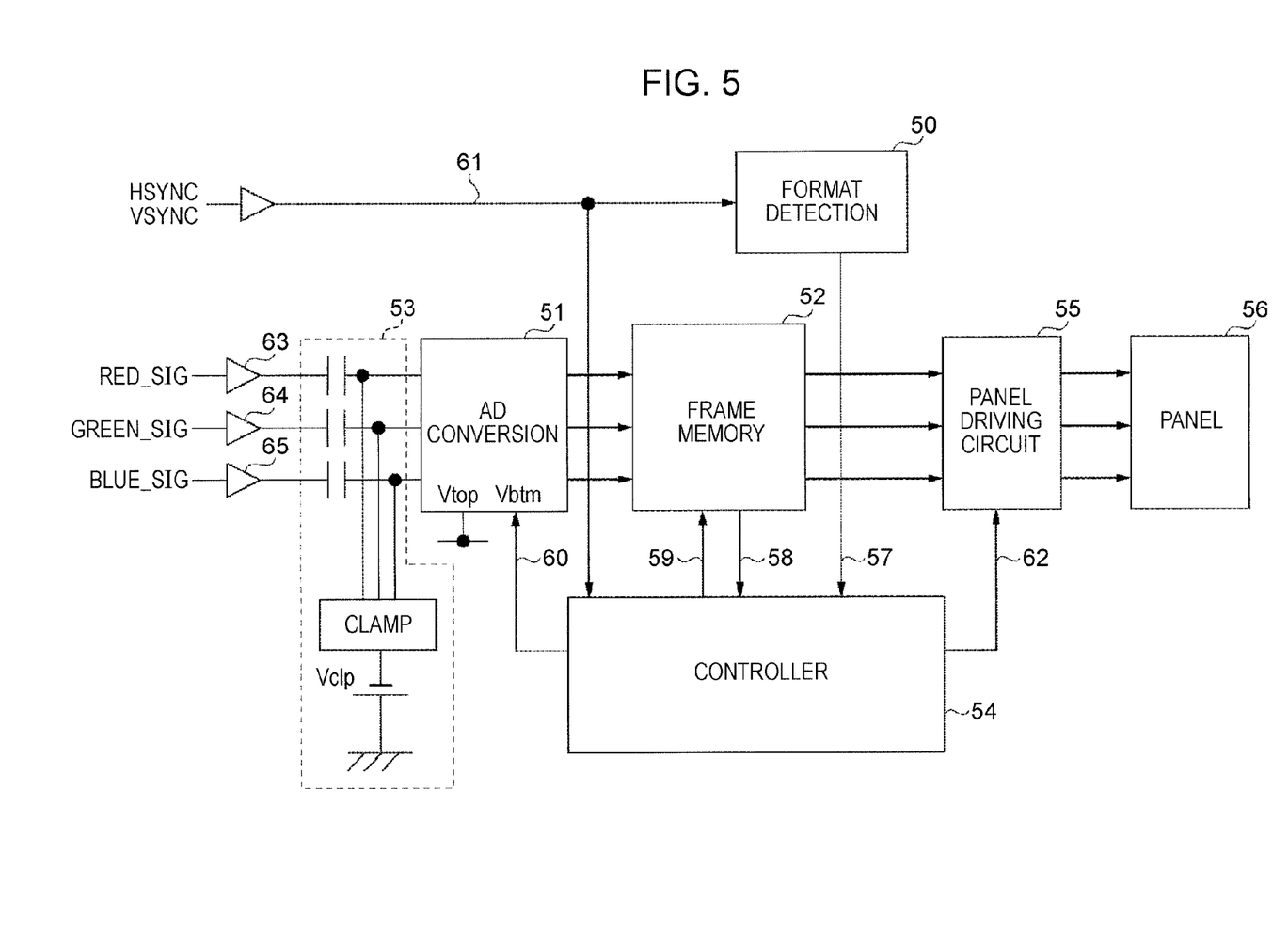
FIG. 5 is a diagram illustrating a second embodiment of the present invention.

FIG. 5 is a diagram illustrating a second embodiment of the present invention.

While the first embodiment is a method for black signal shift means to control the clamp potential before AD conversion, the second embodiment differs from this in being a method for controlling the bottom reference voltage of the AD converter. More specifically, the second embodiment illustrated in FIG. 5 differs from the first embodiment in that a controller 54 controls the bottom reference voltage Vbtm of the AD converter 51. Other signal flows are the same as with the first embodiment, and accordingly description thereof will be omitted.

Figure 6:
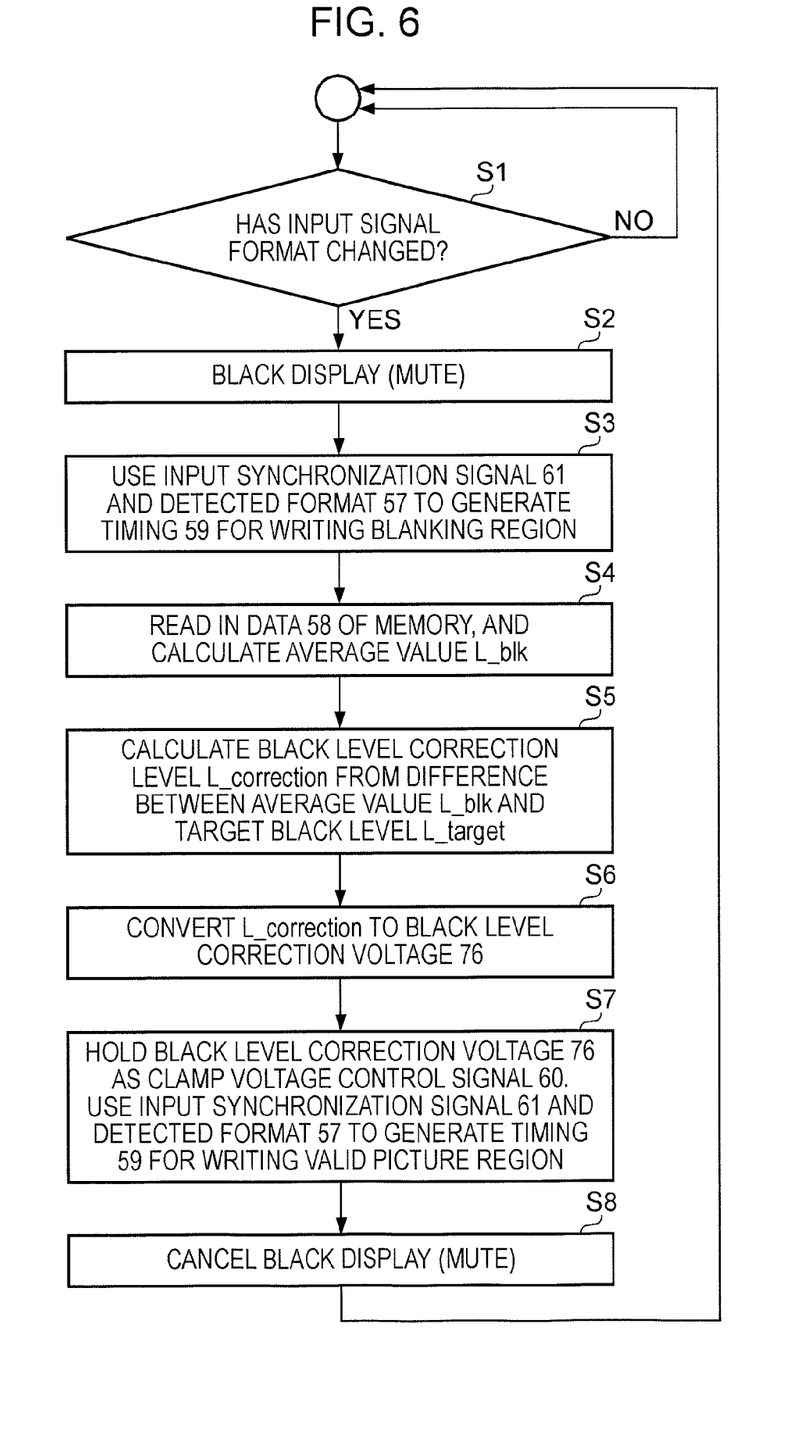
FIG. 6 is a flowchart illustrating the processing flow of the second embodiment.
Figure 7:
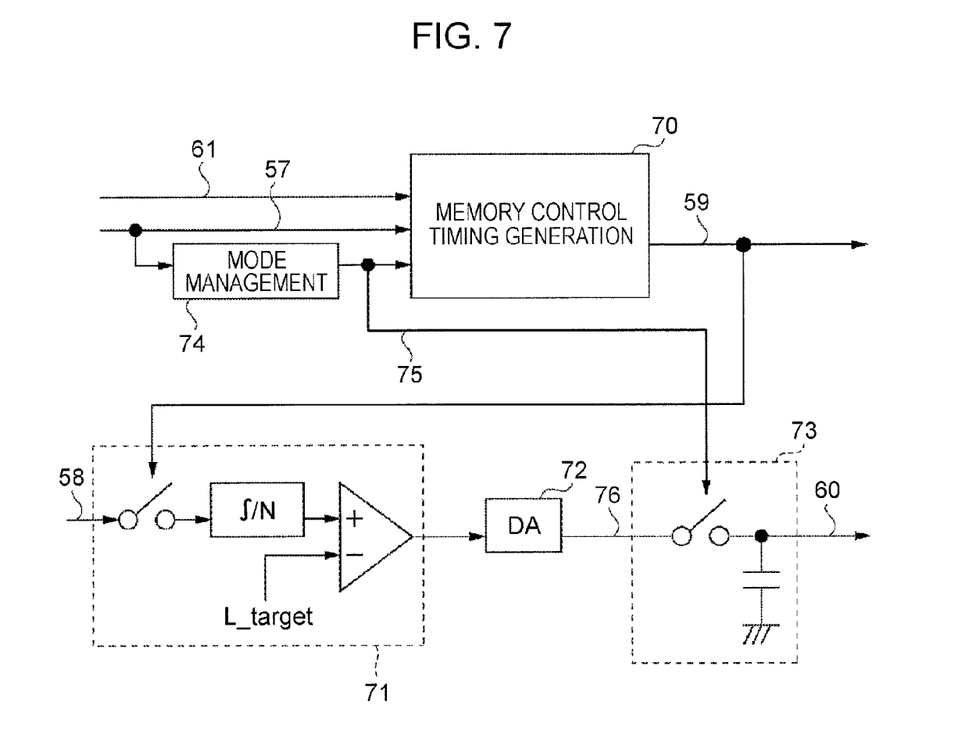
FIG. 7 is a diagram illustrating the internal configuration of a controller according to the second embodiment.

Next, a specific sequence for black level correction processing will be described. FIG. 6 is a flowchart illustrating the flow of processing performed by the controller 54.

Step S0: The picture format information 57 is input, and determination is made regarding whether or not the format of the input signals has changed. In the event that the format has changed, picture format information 57 is obtained from a picture format detecting circuit 50, and a mode managing unit 74 makes transition to the blanking write mode. Only in the event of transition to the blanking write mode does the flow proceed to step S1.

Step S1: The picture format information 57 is received from the picture format detecting circuit 50.

Step S2: A panel driving circuit 55 is subjected to black display or mute control 62, so that the image in the frame memory 52 is not displayed on the panel.

Step S3: At a memory control signal generating unit 70, timing signals 59 are generated so as to write the blanking region 67 of the input picture signals to the frame memory 52, using the synchronizing signals 61 and the picture format information 57.

Step S4: Data 58 of the frame memory 52 is read in and integration and averaging is performed. The averaged value is taken as L_blk.

Step S5: The black level correction level L_correction is calculated from the difference between the average value L_blk and the target back level L_target.

$$L\_correction = L\_target - L\_blk \quad \text{Expression 2}$$

For example, in the event that the black level needs to be always kept at level 0, L_target=0, so $$L\_correction = L\_blk \quad \text{Expression 3}$$

Step S6: The black level correction level L_correction is converted into the black level correction voltage 36 of the analog potential, by the DA converter 32.

Step S7: The mode managing unit 74 makes transition to the valid image write mode, the hold circuit 33 holds the black level correction voltage 76, obtaining clamp potential control signals 60. At the same time, at the memory control signal generating unit 70, timing signals 59 are generated so as to write the valid image region 26 of the input picture signals to the frame memory 52, using the synchronizing signals 61 and the picture format information 57.

Step S8: The panel driving circuit 55 is subjected to cancellation of black display or cancellation of mute control 62, so that the image in the frame memory 52 is displayed on the panel.

Subsequently, the flow returns to step S1.

With the present embodiment, description has been made regarding the arrangement wherein transition is made to the blanking write mode by determining whether or not the picture format of the input signals has changed. However, with devices having multiple input interface terminals for example, mode transition may be made upon the user pressing an input switchover button, or pressing a signal format auto-detect button.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the priority of Japanese Application No. 2005-177963 filed Jun. 17, 2005, which is hereby incorporated by reference herein in its entirety.

What is claimed is:

1. An image display device comprising:
   an AD converter for converting analog picture signals into digital signals;
   an offset adjuster for correcting black level fluctuation due to offset of said analog picture signals;
   a signal format detector for detecting the format of said analog picture signals;
   a frame memory for storing digital signals converted by said AD converter, said digital signals relating to a valid image area and a blanking area; and
   a frame memory writing control unit for determining which one of said valid image area and said blanking area to store in the frame memory;
   wherein when the format of said analog picture signals detected by the signal format detector varies, the frame memory writing control unit stores digital signals of only blanking area in said the frame memory, and when the format of said analog picture signals detected by the signal format detector does not vary, the frame memory writing control unit stores digital signals of only the valid image area in the frame memory,
   wherein the frame memory writing control unit is arranged to calculate an offset correction amount based on the digital signals of the blanking area and a preset target black level, and
   wherein the offset adjuster is arranged to correct the black level fluctuation based on the offset correction amount calculated by the frame memory writing control unit.

2. The image display device according to claim 1, wherein said image display device is a projector device.

3. The image display device according to claim 1, wherein the offset adjuster adjusts the clamp voltage in clamp processing performed upstream from said AD converter.

4. The image display device according to claim 1, wherein the offset adjuster adjusts a bottom reference voltage of the AD converter.

* * * * *